US011316795B2

United States Patent
Huang et al.

(10) Patent No.: US 11,316,795 B2
(45) Date of Patent: Apr. 26, 2022

(54) NETWORK FLOW CONTROL METHOD AND NETWORK DEVICE

(71) Applicant: HUAWEI TECHNOLOGIES CO., LTD., Guangdong (CN)

(72) Inventors: Yong Huang, Shenzhen (CN); Qun Huang, Hong Kong (HK)

(73) Assignee: Huawei Technologies Co., Ltd., Guangdong (CN)

( * ) Notice: Subject to any disclaimer, the term of this patent is extended or adjusted under 35 U.S.C. 154(b) by 47 days.

(21) Appl. No.: 16/130,917

(22) Filed: Sep. 13, 2018

(65) Prior Publication Data

US 2019/0014053 A1     Jan. 10, 2019

Related U.S. Application Data

(63) Continuation of application No. PCT/CN2017/076578, filed on Mar. 14, 2017.

(30) Foreign Application Priority Data

Mar. 14, 2016  (CN) .......................... 201610143420.4

(51) Int. Cl.
  *H04L 12/801* (2013.01)
  *H04L 12/24* (2006.01)
  (Continued)

(52) U.S. Cl.
  CPC .......... *H04L 47/33* (2013.01); *H04L 41/0893* (2013.01); *H04L 41/0896* (2013.01);
  (Continued)

(58) Field of Classification Search
  CPC . H04L 47/33; H04L 41/0896; H04L 41/0893; H04L 47/24; H04L 47/528; H04L 47/122; H04L 47/6275; H04L 47/803
  See application file for complete search history.

(56) References Cited

U.S. PATENT DOCUMENTS 6,498,783 B1 * 12/2002 Lin ...................... H04L 41/5022
  370/252
7,739,383 B1 *  6/2010 Short .................. H04L 63/0892
  709/226
(Continued)

FOREIGN PATENT DOCUMENTS

CN       1750517 A     3/2006
CN       1859195 A    11/2006
(Continued)

OTHER PUBLICATIONS

Extended European Search Report issued in European Application No. 17765816.8 dated Jan. 23, 2019, 10 pages.
(Continued)

*Primary Examiner* — Davoud A Zand
*Assistant Examiner* — Adam A Cooney
(74) *Attorney, Agent, or Firm* — Fish & Richardson P.C.

(57) ABSTRACT

Embodiments of this application provide a network flow control method and a network device. The method includes: receiving a packet flow; determining, based on a service type of the packet flow, a service pipeline used for transmitting the packet flow, where service types of all packet flows in the service pipeline are the same; and based on a bandwidth weight allocated to the service type, transferring the packet flow in the service pipeline to a physical port. In the embodiments of this application, packet flows are allocated to different service pipelines based on a service type, and bandwidth weights are allocated, in a centralized manner, to service pipelines that carry a same service type.

15 Claims, 8 Drawing Sheets

(51) Int. Cl.
  *H04L 12/803*   (2013.01)
  *H04L 47/33*    (2022.01)
  *H04L 41/0893*  (2022.01)
  *H04L 41/0896*  (2022.01)
  *H04L 12/865*   (2013.01)
  *H04L 12/873*   (2013.01)
  *H04L 12/851*   (2013.01)
  *H04L 47/6275*  (2022.01)
  *H04L 47/122*   (2022.01)
  *H04L 47/52*    (2022.01)
  *H04L 47/24*    (2022.01)

(52) U.S. Cl.
  CPC ............ *H04L 47/122* (2013.01); *H04L 47/24* (2013.01); *H04L 47/528* (2013.01); *H04L 47/6275* (2013.01)

(56) References Cited

U.S. PATENT DOCUMENTS

| | | | | |
|---|---|---|---|---|
| 9,521,177  | B2* | 12/2016 | Gahm | H04L 65/601 |
| 9,813,933  | B2* | 11/2017 | Sun | H04L 47/125 |
| 10,028,290 | B2* | 7/2018  | Jo | H04W 72/085 |
| 2004/0184449 | A1* | 9/2004  | Sreejith | H04L 47/125 370/367 |
| 2006/0171307 | A1* | 8/2006  | Gopalakrishnan | H04L 1/0009 370/229 |
| 2007/0002870 | A1* | 1/2007  | Pekonen | H04L 29/06027 370/395.42 |
| 2008/0273553 | A1* | 11/2008 | Wang | H04L 41/0896 370/468 |
| 2009/0262644 | A1* | 10/2009 | Al-Banna | H04L 47/762 370/232 |
| 2014/0029936 | A1  | 1/2014  | Kramer et al. | |
| 2014/0169161 | A1* | 6/2014  | Wang | H04L 47/24 370/229 |
| 2015/0043335 | A1* | 2/2015  | Testicioglu | H04L 45/48 370/230 |
| 2015/0074285 | A1  | 3/2015  | Gahm et al. | |
| 2015/0131442 | A1  | 5/2015  | CZ et al. | |
| 2016/0007223 | A1* | 1/2016  | Sun | H04L 29/06 709/219 |
| 2016/0352413 | A1* | 12/2016 | Tani | H04B 7/2041 |

FOREIGN PATENT DOCUMENTS

| | | |
|---|---|---|
| CN | 101257453 A   | 9/2008 |
| CN | 101453400 A   | 6/2009 |
| CN | 101686196 A   | 3/2010 |
| CN | 102026046 A   | 4/2011 |
| CN | 102204130 A   | 9/2011 |
| CN | 102594682 A   | 7/2012 |
| CN | 102821029 A   | 12/2012 |
| CN | 103281258 A   | 9/2013 |
| EP | 1950908 A1    | 7/2008 |
| EP | 2985963 A1    | 2/2016 |
| WO | 2013072776 A2 | 5/2013 |
| WO | 2014101439 A1 | 7/2014 |
| WO | 2014173466 A1 | 10/2014 |

OTHER PUBLICATIONS

R. Braden et al., Resource Reservation Protocol (RSVP)—Version 1 Functional Specification. RFC2205, Sep. 1997, 112 pages.
J. Wroclawski, The Use of RSVP with IETF Integrated Services. RFC2210, Sep. 1997, 33 pages.
S. Shenker et al., Specification of Guaranteed Quality of Service. RFC2212, Sep. 1997, 20 pages.
L. Berger et al., Generalized Multi-Protocol Label Switching (GMPLS) Signaling Resource ReserVation Protocol—Traffic Engineering (RSVP-TE) Extensions. RFC3473, Jan. 2003, 42 pages.
International Search Report issued in International Application No. PCT/CN2017/076578 dated Apr. 27, 2017, 9 pages.
Office Action issued in Chinese Application No. 201610143420.4 dated Mar. 26, 2020, 8 pages.
Office Action issued in Chinese Application No. 201610143420.4 dated May 8, 2021, 6 pages (with English translation).
EPO Communication pursuant to Article 94(3) EPC issued in European Application No. 17765816.8 dated Feb. 4, 2021, 7 pages.

* cited by examiner

NETWORK FLOW CONTROL METHOD AND NETWORK DEVICE

CROSS-REFERENCE TO RELATED APPLICATIONS

This application is a continuation of International Application No. PCT/CN2017/076578, filed on Mar. 14, 2017, which claims priority to Chinese Patent Application No. 201610143420.4, filed on Mar. 14, 2016, The disclosures of the aforementioned applications are hereby incorporated by reference in their entireties.

TECHNICAL FIELD

This application relates to the communications field, and more specifically, to a network flow control method and a network device.

BACKGROUND

A modern network is a shared network. A network resource is a distributed resource. The network resource is different from a computing resource and a storage resource. How to share a network is an existing problem. Widespread application of cloud technologies, massive construction of a cloud Internet, and emergence of network functions virtualization (Network Function Virtualization, NFV) technologies impose diversified service requirements for a wide area network (Wide Area Network, WAN). Therefore, requirements for WAN network quality are also increased.

The earliest research on quality of service (Quality of Service, QoS) technologies of a flow control network service began in the 1990s, and the most important technology is a Resource Reservation Protocol (Resource reservation Protocol, RSVP) technology. However, because the algorithm is complex, many parameters in the algorithm cannot be obtained, and consequently, the technology still remains in a theoretical phase. In addition, the RSVP algorithm is difficult to deploy or expand, and the algorithm is aimed at a guarantee service (Guarantee Service) that has low network utilization. Therefore, the technology is not used in a network in a large scale.

For a long time, both a data center (DataCenter, DC) network and a WAN network use high bandwidth and a differentiated service DiffServ manner to guarantee quality of service. This manner is simple without a need of sophisticated control, and therefore is popular. Because of this, bandwidth utilization is extremely low and bandwidth allocation is unbalanced in this manner, and therefore, quality of a high burstiness service, a low latency service, or the like cannot be well guaranteed.

In recent years, people realize that centralized and extensive network management is increasingly incapable of meeting various ever-increasing network requirements. With emergence of a software-defined networking (Software Defined Network, SDN) technology, there are many researches on a centralized flow control technology that is based on an SDN idea. A main idea of the technology is constructing a dynamic flow matrix by collecting flow directions of network flows; and adjusting a path in a network based on the flow matrix, so as to achieve optimal network performance and network utilization. However, in such a solution, there is a problem of collecting a large amount of actual flow information and making decisions in real time. Real-time quality and expansibility of the network cannot be well guaranteed.

In addition, there are many researches on innovation that is based on a Transmission Control Protocol (Transmission Control Protocol, TCP) TCP flow control mechanism, and the researches are mainly some detailed researches such as congestion control and sliding window adjustment. $D^2TCP$ is used as an example. Specifically, a main idea of $D^2TCP$ is that when congestion is detected, for a flow with a far deadline (far deadline), a transmit end greatly reduces a send window; and for a flow with a near deadline (near deadline), the transmit end slightly reduces a send window. This type of per-flow control mechanism provides an advantage of rapid response. However, different mechanisms affect each other in a network environment in which a plurality of services coexist. In addition, an application may enable more flows to occupy more bandwidth. This causes unfairness in network use.

In practice, in a network in which a plurality of services coexist, mutual interference is generated between multiple types of service flows, and performance requirements of service flows of different service types are difficult to balance.

SUMMARY

Embodiments of this application provide a network flow control method, so as to schedule, based on a bandwidth weight corresponding to each service type, a packet flow in a service pipeline corresponding to the service type.

According to a first aspect, a network flow control method is provided, including: receiving a packet flow; determining, based on a service type of the packet flow, a service pipeline used for transmitting the packet flow, where service types of all packet flows in the service pipeline are the same; and based on a bandwidth weight allocated to the service type, transferring the packet flow by using the service pipeline.

A bandwidth weight of a service type refers to a proportion of maximum allowed occupied bandwidth of the service type to maximum available bandwidth. The maximum available bandwidth is usually total bandwidth of one or more physical ports that can be used by the service type, or bandwidth of a virtual network physical port of the service type in a virtual network.

It should be understood that the method may be performed by a communications entity. The bandwidth weight allocated to the service type may be preset locally by the communications entity, or may be set based on a bandwidth weight sent by another device such as a mediation device. This application is not limited thereto. The communications entity may be a communications device such as a host, a customer terminal, a switch, a virtual switch, a router, or a virtual router. It should be understood that this application is not limited thereto.

In this embodiment of this application, packet flows are allocated to different service pipelines based on a service type, and bandwidth weights are allocated, in a centralized manner, to service pipelines that carry a same service type. Therefore, each service pipeline can schedule packet flows in the service pipeline based on a bandwidth weight allocated to a specific service type, so as to avoid mutual interference generated between packet flows of different service types, and meet performance requirements of service flows of different service types.

With reference to the first aspect, in a first possible implementation of the first aspect, before the transferring the packet flow by using the service pipeline, the method further includes: performing pipeline scheduling on the packet flows in the service pipeline based on the bandwidth weight allocated to the service pipeline corresponding to the service type.

That is, the communications entity may further separately allocate a bandwidth weight to each service pipeline. This may not only implement mutual isolation between packet flows of various service types, but also implement separate weight control on packet flows in various service pipelines, thereby implementing finer network flow control.

With reference to the first aspect and the foregoing implementation of the first aspect, in a second possible implementation of the first aspect, before the sending the packet flow in the service pipeline to a physical port, the method further includes: performing in-pipeline scheduling on the packet flows in the service pipeline based on the service type of the packet flow in the service pipeline.

Each service pipeline carries a service flow that has a specific service type, and performance requirements of service flows of various service types are different. Therefore, personalized in-pipeline scheduling is performed on a packet flow in each service pipeline based on a packet type. This can meet service requirements of different service types and further improve network performance.

With reference to the first aspect and the foregoing implementations of the first aspect, in a third possible implementation of the first aspect, the performing in-pipeline scheduling on the packet flows in the service pipeline based on the service type of the packet flow in the service pipeline includes one of the following: when the service type of the packet flow in the service pipeline is a throughput sensitive service, performing scheduling on the packet flows in the service pipeline in a first in first out queue scheduling manner; when the service type of the packet flow in the service pipeline is a deadline sensitive service, determining a priority of each packet flow based on a deadline of each service flow in the service pipeline, and scheduling each packet flow based on the priority of each packet flow, where a service flow with an earlier deadline is corresponding to a higher priority; when the service type of the packet flow in the service pipeline is a latency sensitive service, performing scheduling on the packet flows in the service pipeline in a first in first out queue scheduling manner on the premise of guaranteeing minimum bandwidth of the packet flows in the service pipeline; or when the service type of the packet flow in the service pipeline is a priority sensitive service, determining a priority of each packet flow in the service pipeline, and scheduling each packet flow based on the priority of each packet flow.

With reference to the first aspect and the foregoing implementations of the first aspect, in a fourth possible implementation of the first aspect, the method further includes: determining a transmission rate of the packet flow in the service pipeline based on a congestion status of the service pipeline and the bandwidth weight allocated to the service type.

With reference to the first aspect and the foregoing implementations of the first aspect, in a fifth possible implementation of the first aspect, the determining a transmission rate of the packet flow in the service pipeline based on a congestion status of the service pipeline and the bandwidth weight allocated to the service type includes: when the service pipeline is in a non-congested state, determining a transmission rate $R(t)$ of the packet flow in the service pipeline at a moment t by using the following formula:

$$R(t)=\min(R(t-T)\times(1+w), R_{max}\times w), \text{ where}$$

a transmission rate of the service pipeline at a moment t−T is $R(t-T)$, the bandwidth weight allocated to the service type is w, and maximum bandwidth that can be occupied by the $i^{th}$ service pipeline is $R_{max}$; or when the service pipeline is in a congested state, determining a transmission rate $R(t)$ of the packet flow in the service pipeline at a moment t by using the following formula:

$$R(t)=R(t-T)\times(1-\alpha w), \text{ where}$$

a transmission rate of the service pipeline at a moment t−T is $R(t-T)$, the bandwidth weight allocated to the service type is w, and a congestion degree of the service pipeline is $\alpha$, where $0<\alpha<1$.

With reference to the first aspect and the foregoing implementations of the first aspect, in a sixth possible implementation of the first aspect, the weight notification message carries current usage bandwidth of each service type on the communications entity, or carries a current bandwidth weight; and a weight notification response fed back by the mediation device is received, where the weight notification response carries a target bandwidth weight of each service type. The current bandwidth weight refers to a proportion of the current usage bandwidth of each service type on the communications entity to total available bandwidth. It should be noted herein that there is a simple conversion relationship between the current usage bandwidth, the current bandwidth weight, and total bandwidth occupied by multiple current service types, and all related combinations in the weight notification message fall within the protection scope of this application.

Therefore, the mediation device may communicate with a plurality of communications entities, collect a weight notification message of each communications entity in the plurality of communications entities, intelligently determine a bandwidth bottleneck communications entity of each service type by using distribution information of each communications entity, and instruct each communications entity to update a network weight occupied by each service, so as to maximize network utilization.

With reference to the first aspect and the foregoing implementations of the first aspect, in a seventh possible implementation of the first aspect, the weight notification message further carries at least one piece of the following information: a physical port identifier of the communications entity, an identifier or an address of the communications entity, a destination communications entity identifier or address of each service packet flow on the communications entity, a pipeline identifier of each service pipeline on the communications entity, or a service type carried in each service pipeline on the communications entity.

With reference to the first aspect and the foregoing implementations of the first aspect, in an eighth possible implementation of the first aspect, the method further includes: receiving a weight update message sent by the mediation device, where the weight update message carries a bandwidth weight allocated to each service type on the communications entity, or carries maximum allowed bandwidth allocated to each service type on the communications entity.

That is, after receiving the weight update message sent by the mediation device, the communications entity updates the bandwidth weight that can be allocated to and used by each service type on the communications entity.

Therefore, this embodiment of this application can ensure network performance when applications of different service types coexist, ensure real-time adaptation to a network status change, meet network deployment scalability, and support large-scale network deployment.

According to a second aspect, a network flow control method is provided, including: receiving a weight notification message of each communications entity in a plurality of communications entities, where a weight notification message if an $i^{th}$ communications entity in the plurality of communications entities carries current usage bandwidth of each service type on the $i^{th}$ communications entity; and determining target maximum allowed bandwidth of a $j^{th}$ service type on the $i^{th}$ communications entity based on the weight notification message of each communications entity in the plurality of communications entities.

On a communications entity, bandwidth may be wasted because a configuration of a service bandwidth weight does not match a network resource allocation actually used by a service, and consequently, resource utilization of an entire network is reduced.

In this embodiment of this application, a bandwidth weight of each service type can be dynamically determined based on an actual bandwidth occupation status of each service type, so as to achieve optimal utilization of an entire network, and a fair or commercial fair use of a network.

With reference to the second aspect, in a first possible implementation of the second aspect, the determining maximum allowed bandwidth of a $j^{th}$ service type on the $i^{th}$ communications entity based on the weight notification message of each communications entity in the plurality of communications entities includes: determining a bottleneck communications entity with greatest current total usage bandwidth from the plurality of communications entities according to current usage bandwidth that is of each service type and that is carried in the weight notification message of each communications entity, where the $j^{th}$ service type exists on the bottleneck communications entity; based on a proportion of current usage bandwidth of each service type on the bottleneck communications entity in the current total usage bandwidth, determining maximum allowed bandwidth of the $j^{th}$ service type on the bottleneck communications entity when maximum available bandwidth of the bottleneck communications entity is totally occupied; and determining the target maximum allowed bandwidth of the $j^{th}$ service type on the $i^{th}$ communications entity based on the maximum allowed bandwidth of the $j^{th}$ service type on the bottleneck communications entity, and a proportion of current usage bandwidth of the $j^{th}$ service type on the $i^{th}$ communications entity to current usage bandwidth of the $j^{th}$ service type on the bottleneck communications entity.

With reference to the second aspect and the foregoing implementation of the second aspect, in a second possible implementation of the second aspect, the weight notification message of the $i^{th}$ communications entity in the plurality of communications entities carries current maximum allowed bandwidth of each service type on the $i^{th}$ communications entity, and the method further includes: when current maximum allowed bandwidth configured for the $j^{th}$ service type on the $i^{th}$ communications entity is different from the target maximum allowed bandwidth of the $j^{th}$ service type, sending the target maximum allowed bandwidth of the $i^{th}$ service type to the $i^{th}$ communications entity.

With reference to the second aspect and the foregoing implementations of the second aspect, in a third possible implementation of the second aspect, the method further includes: determining a proportion of the target maximum allowed bandwidth of the $j^{th}$ service type to maximum total bandwidth of the $i^{th}$ communications entity as a maximum bandwidth weight of the $j^{th}$ service type.

According to a third aspect, a network entity is provided, including: a receiving unit, a determining unit, and a scheduling unit. The network entity is configured to perform the method in any one of the first aspect or the possible implementations of the first aspect.

According to a fourth aspect, a network device is provided, including: a receiving unit and a determining unit. The network entity is configured to perform the method in any one of the second aspect or the possible implementations of the second aspect.

According to a fifth aspect, an apparatus is provided, including: a processor, a receiver, a transmitter, and a memory. The processor and the memory are connected by using a bus system, the memory is configured to store an instruction, and the processor is configured to execute the instruction stored in the memory, to control the receiver to receive a signal, and control the transmitter to send a signal, so that the apparatus performs the method in any one of the first aspect or the possible implementations of the first aspect.

According to a sixth aspect, an apparatus is provided, including: a processor, a memory, a receiver, and a transmitter. The processor, the memory, and the receiver are connected by using a bus system, the memory is configured to store an instruction, and the processor is configured to execute the instruction stored in the memory, to control the receiver to receive a signal, and control the transmitter to send a signal, so that the apparatus performs the method in any one of the second aspect or the possible implementations of the second aspect.

According to a seventh aspect, a computer-readable medium is provided and is configured to store a computer program, and the computer program includes an instruction used to perform the method in any one of the first aspect or the possible implementations of the first aspect.

According to an eighth aspect, a computer-readable medium is provided and is configured to store a computer program, and the computer program includes an instruction used to perform the method in any one of the second aspect or the possible implementations of the second aspect.

DESCRIPTION OF EMBODIMENTS

The following describes the technical solutions in the embodiments of this application with reference to the accompanying drawings in the embodiments of this application.

Figure 1:
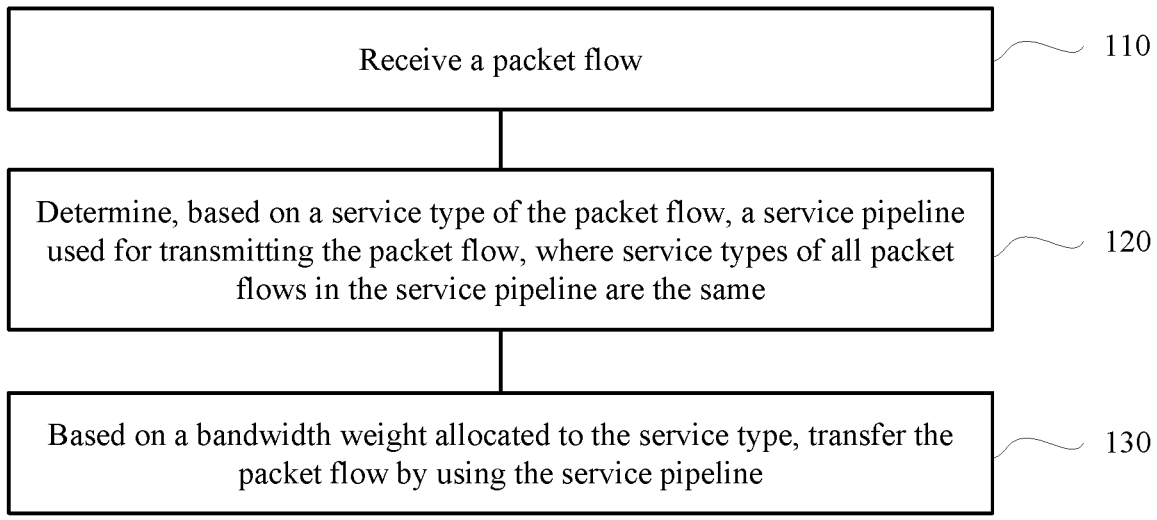
FIG. 1 is a schematic diagram of a network flow control method according to an embodiment of this application.

FIG. 1 is a schematic diagram of a network flow control method according to an embodiment of this application. The method is performed by a communications entity. As shown in FIG. 1, the method includes:

Step 110: Receive a packet flow.

Step 120: Determine, based on a service type of the packet flow, a service pipeline used for transmitting the packet flow, where service types of all packet flows in the service pipeline are the same.

Step 130: Based on a bandwidth weight allocated to the service type, transfer the packet flow by using the service pipeline.

The communications entity may be a communications device such as a host, a customer terminal, a switch, a virtual switch, a router, or a virtual router. It should be understood that this application is not limited thereto.

Specifically, in step 110, the communications entity obtains one or more packet flows from a physical link. Packets in a same packet flow have same 5-tuple information. More specifically, the packets in a same packet flow have a same source address and destination address.

In step 120, when obtaining a specific packet flow, the communications entity needs to determine, based on a service type of the flow, a service pipeline used for transmitting the packet flow.

Specifically, the communications entity may determine the service type of the packet flow in one of the following manners: When an application is deployed, a cloud management system or an SDN controller configures a service type on an edge channel entity, for example, the service type of the application may be determined by using a packet with a specific destination address and source address; an application type is inferred by using a common port number carried in a service packet, for example, an FTP signaling port number TCP 21, a DNS port number UDP 67, or an HTTP port number TCP 80; and the service type to which the packet flow belongs is identified by using a technology such as deep packet inspection DPI (Deep Packet Inspection). It should be understood that this application is not limited thereto, and another method that can be used to determine the service type of the packet flow falls within the scope of this application.

Specifically, that the communications entity determines the service pipeline used for transmitting the packet flow is allocating, based on the service type of the packet flow, the packet flow to a service pipeline corresponding to the packet flow. Packet flows in the service pipeline have a same service type. The service pipeline is a logical pipeline that has a specific pipeline source address and destination address. The logical pipeline carries a packet flow with a specific service type. Therefore, it can also be said that the service pipeline is a logical pipeline of the specific service type. In implementation, the service pipeline may be identified and differentiated by using a technology such as an IEEE 802.1Q VLAN identifier, a Multiprotocol Label Switching (MPLS) label, GRE (Generic Routing Encapsulation), or VXLAN (Virtual eXtensible Local Area Network). It should be understood that determining the service pipeline of the packet flow may further need other information, for example, information such as a source address and a destination address of the packet flow, so that the service pipeline of the packet flow can be determined. This application is not limited thereto.

A specific example is used for description. After obtaining information about a source address and a destination address of a packet, the communications entity may determine a service pipeline of the packet by searching a pipeline table preset in the communications entity. The pipeline table includes the following entries: a packet source address, a packet destination address, a service type to which a packet belongs, a source address of a service pipeline, a destination address of the service pipeline, a pipeline number, and an output physical port number.

According to the pipeline table, the communications entity may determine a service type of a packet flow, corresponding service pipeline information, and corresponding output physical link information by obtaining information such as a source address and a destination address of the packet flow or the service type of the packet flow. After pipeline encapsulation is performed on a packet in the packet flow, that is, after a pipeline source address and destination address or pipeline identification information is added to a packet header, the encapsulated packet flow may be sent to a corresponding physical link by using a corresponding service pipeline. A best effort BE (Best Effort) packet or a packet whose service type cannot be identified is directly sent to an output physical link.

Specifically, in step 130, the communications entity performs scheduling on the packet flow in the service pipeline based on the bandwidth weight allocated to the service type. All the packet flows carried in the service pipeline have a same service type. There may be one or more service pipelines that carry a same service type of packet flows. Service types of packet flows carried in each of these service pipelines are the same, but pipeline destination addresses or pipeline source addresses of the service pipelines are different. The communications entity allocates a bandwidth weight to each service type. The one or more service pipelines that carry a same service type of service flows share the partial bandwidth weight. The process of scheduling the packet flow by the service pipeline is essentially a process of sending a service packet to a physical port according to specific bandwidth.

It should be understood that the communications entity may further separately allocate a bandwidth weight to each service pipeline. This may not only implement mutual isolation between packet flows of different service types, but also implement mutual isolation between packet flows of different service pipelines, thereby implementing finer network flow control.

It should be further understood that the bandwidth weight configured by the communications entity for each service type may be preconfigured on the communications entity. Alternatively, the communications entity may receive configuration information sent by another communications entity such as a mediation device, and perform weight update configuration based on the received configuration message sent by that communications entity. A bandwidth weight configuration update period of each service type may be fixed or not fixed. This application is not limited thereto.

In this embodiment of this application, packet flows are allocated to different service pipelines based on a service type, and bandwidth weights are allocated, in a centralized manner, to service pipelines that carry a same service type. Therefore, the communications entity can schedule packet flows based on a bandwidth weight allocated to a specific service type, so as to avoid mutual interference generated between packet flows of different service types. Separate configuration may be performed to meet performance requirements of service flows of different service types.

Optionally, in an embodiment of this application, before the packet flow in the service pipeline is sent to the physical port, the method further includes: performing in-pipeline scheduling on the packet flows in the service pipeline based on the service type of the packet flow in the service pipeline.

Specifically, each service pipeline carries a service flow that has a specific service type, and performance requirements of service flows of various service types are different. Therefore, personalized in-pipeline scheduling is performed on a packet flow in each service pipeline based on a packet type. This can meet service requirements of different service types and further improve network performance.

Optionally, in an embodiment of this application, the performing in-pipeline scheduling on the packet flows in the service pipeline based on the service type of the packet flow in the service pipeline includes one of the following: when the service type of the packet flow in the service pipeline is a throughput sensitive (Throughput Sensitive, TS) service, performing scheduling on the packet flows in the service pipeline in a first in first out (First in first out, FIFO) queue scheduling manner; when the service type of the packet flow in the service pipeline is a deadline sensitive (deadline sensitive, DS) service, determining a priority of each packet flow based on a deadline of each service flow in the service pipeline, and scheduling the packet flow based on the priority of each packet flow, where a service flow with an earlier deadline is corresponding to a higher priority; when the service type of the packet flow in the service pipeline is a latency sensitive (latency sensitive, LS) service, ensuring that total bandwidth of the service pipeline is greater than a sum of bandwidth of all packet flows in the pipeline, and performing scheduling on the packet flows in the service pipeline in a first in first out queue scheduling manner; or when the service type of the packet flow in the service pipeline is a priority sensitive (priority sensitive, PS) service, determining a priority of each packet flow in the service pipeline, and scheduling each packet flow based on the priority of each packet flow. It should be understood that this application is not limited to the enumerated service types.

Optionally, in an embodiment of this application, the method further includes: determining a transmission rate of the service pipeline based on a congestion status of the service pipeline and the bandwidth weight allocated to the service type.

It should be understood that the congestion status of the service pipeline may include two statuses: a congested state and a non-congested state. When the pipeline is in the congested state, there may further be a specific congestion degree. When the congestion status of the service pipeline is being determined, independent congestion detection is performed on a destination end of each service pipeline, and the congestion status of the service pipeline may be fed back to a source end. A specific congestion detection method includes one of the following:

(1) Explicit congestion notification (Explicit Congestion Notification, ECN): The method is specifically that a switch, a router, or the like in a network attaches a congestion mark to a congested packet after detecting congestion, and congestion information is fed back to the source end by the destination end.

(2) The source end adds a packet sequence number to a packet sent to the destination end by using the service pipeline, the destination end detects a lost sequence number to detect a congestion degree, and the destination end feeds back information about the congestion degree to the source end. Alternatively, a maximum link occupation rate of a passed physical link is carried in a packet sent to the destination end, and the destination end feeds back the maximum link occupation rate carried in the packet in the service pipeline to a source end corresponding to a logical pipeline, so as to implement congestion detection.

It should be understood that whether congestion is detected or the congestion degree is determined by specific parameters of different devices. This application is not limited thereto.

Specifically, a transmission rate of a packet in each service pipeline is bit/s (bit/s), or may be understood as usage bandwidth of a service pipeline. That is, each service pipeline can determine current usage bandwidth of the service pipeline by using an adaptive congestion detection manner. The current usage bandwidth does not exceed maximum bandwidth allowed to be used by the service pipeline, that is, a bandwidth weight that can be used by the service pipeline. In addition, usage bandwidth of each service pipeline is not less than minimum reserved bandwidth of the service pipeline.

Optionally, in an embodiment of this application, the determining a transmission rate of the packet flow in the service pipeline based on a congestion status of the service pipeline and the bandwidth weight allocated to the service type includes: when the service pipeline is in a non-congested state, increasing a transmission rate R(t) of the packet flow in the service pipeline at a moment t by using the following formula:

$$R(t)=\min(R(t-T)\times(1+w),R_{max}\times w), \text{ where}$$

a transmission rate of the service pipeline at a moment t−T is R(t−T), the bandwidth weight allocated to the service type is w, and maximum bandwidth that can be occupied by the service pipeline is $R_{max}$; or when the service pipeline is in a congested state, determining a transmission rate R(t) of the packet flow in the service pipeline at a moment t by using the following formula:

$$R(t)=R(t-T)\times(1-\alpha w), \text{ where}$$

a transmission rate of the service pipeline at a moment t−T is R(t−T), the bandwidth weight allocated to the service type is w, and a congestion degree of the service pipeline is α, where 0<α<1. That is, when congestion occurs, each service pipeline decreases the current usage bandwidth based on a proportion of the service type to which the service pipeline belongs and a congestion degree.

Therefore, each service pipeline may implement independent rate adjustment and determine usage bandwidth of each service pipeline by using a congestion status and a service bandwidth weight of the service pipeline, so as to ensure real-time adaptation to a network status change.

Optionally, in an embodiment of this application, the method further includes: sending, by the communications entity, a weight notification message to a mediation device, where the weight notification message carries current usage bandwidth of each service type on the communications entity.

The mediation device may communicate with a plurality of communications entities, collect a weight notification message of each communications entity in the plurality of communications entities, intelligently determine a bandwidth bottleneck communications entity of each service type by using distribution information of each communications entity, and instruct each communications entity to update a bandwidth weight occupied by each service, so as to maximize network utilization.

Optionally, in an embodiment of this application, the weight notification message further carries at least one piece of the following information: a physical port identifier of the communications entity, an identifier or an address of the communications entity, a destination communications entity identifier or address of each service packet flow on the communications entity, a pipeline identifier of each service pipeline on the communications entity, or a service type carried in each service pipeline on the communications entity. In terms of implementation, the weight notification message carries physical port identifier information of the communications entity so that a central mediator conveniently obtains maximum bandwidth of a physical link corresponding to a physical port and path information related to the physical port. The weight notification message carries the identifier or the address of the communications entity to specify a communication source and destination, so as to facilitate finding a path corresponding to the source and the destination, and facilitate determining a related communications party, thereby implementing bandwidth weight calculation and update.

Optionally, in an embodiment of this application, the method further includes: receiving a weight update message sent by the mediation device, where the weight update message carries a bandwidth weight allocated to each service type on the communications entity.

It should be understood that, before the weight update message sent by the mediation device is received, the bandwidth weight allocated to each service type on the communications entity may be a preset initial value, and this application is not limited thereto.

That is, after receiving the weight update message sent by the mediation device, the communications entity updates the bandwidth weight that can be allocated to and used by each service type on the communications entity.

Therefore, this embodiment of this application can ensure network performance when applications of different service types coexist, ensure real-time adaptation to a network status change, meet network deployment scalability, and support large-scale network deployment.

Figure 2:
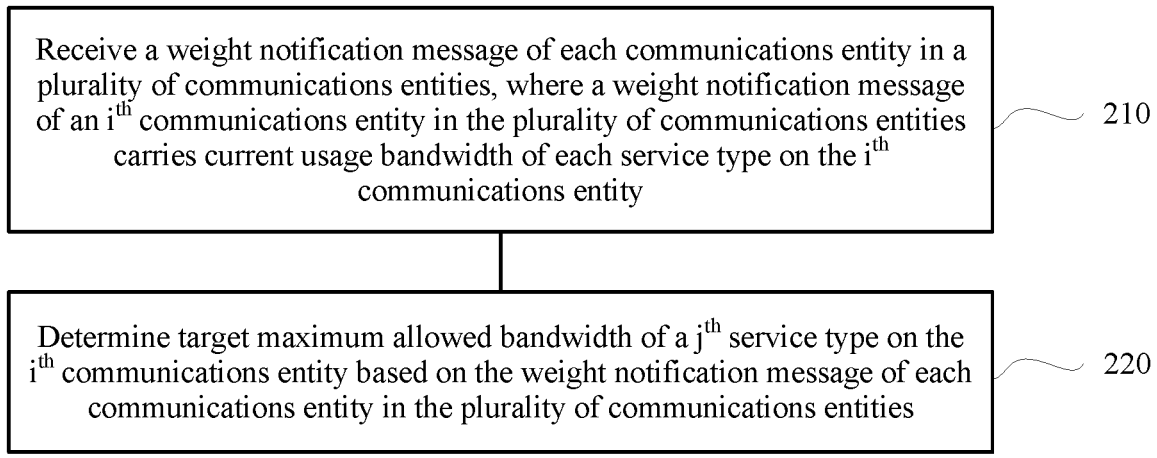
FIG. 2 is a schematic diagram of a network flow control method according to another embodiment of this application.

FIG. 2 is a schematic diagram of a network flow control method according to another embodiment of this application. The method is performed by a mediation device. The mediation device may be a server, a router in a network, or a software process running in a network or a data center. This application is not limited thereto. As shown in FIG. 2, the method includes:

Step 210: Receive a weight notification message of each communications entity in a plurality of communications entities, where a weight notification message of an $i^{th}$ communications entity in the plurality of communications entities carries current usage bandwidth of each service type on the $i^{th}$ communications entity.

Step 220: Determine target maximum allowed bandwidth of a $j^{th}$ service type on the $i^{th}$ communications entity based on the weight notification message of each communications entity in the plurality of communications entities.

In step 210, the weight notification message of the $i^{th}$ communications entity carries the current usage bandwidth of each service type on the $i^{th}$ communications entity. It should be understood that other information equivalent to the current usage bandwidth also falls within the scope of this application. This application is not limited thereto. For example, when the weight notification message carries a weight of the current usage bandwidth of each service in all current usage bandwidth, the current usage bandwidth of each service type may also be deduced.

Specifically, in step 210, any two communications entities in the plurality of communications entities may communicate with each other. A weight notification message of each communications entity carries current usage bandwidth of each service type on the communications entity. That is, the $i^{th}$ weight notification message corresponding to the $i^{th}$ communications entity carries the current usage bandwidth of each service type on the $i^{th}$ communications entity. It should be understood that the current usage bandwidth of any service type on the $i^{th}$ communications entity may be a sum of current occupation statuses of one or more service pipelines of the service type. It should be understood that when a plurality of service pipelines share current usage bandwidth of one service type, the plurality of service pipelines may perform dynamic adjustment based on a congestion status of a packet flow of each service pipeline, or the current usage bandwidth may be simply evenly allocated. This application is not limited thereto.

In step 220, target maximum allowed bandwidth of each service type on each communications entity may be determined based on the weight notification message of each communications entity in the plurality of communications entities. That is, the mediation device may find a bottleneck communications entity in the plurality of communications entities by collecting a bandwidth usage status of each communications entity in the plurality of communications entities, so as to determine the target maximum allowed bandwidth of each service on each communications entity.

On a communications entity, bandwidth may be wasted because a configuration of a service bandwidth weight does not match a network resource allocation actually used by a service, and consequently, resource utilization of an entire network is reduced.

In this embodiment of this application, a bandwidth weight of each service type can be dynamically determined based on an actual bandwidth occupation status of each service type, so as to achieve optimal utilization of an entire network, and a fair or commercial fair use of a network.

Figure 7:
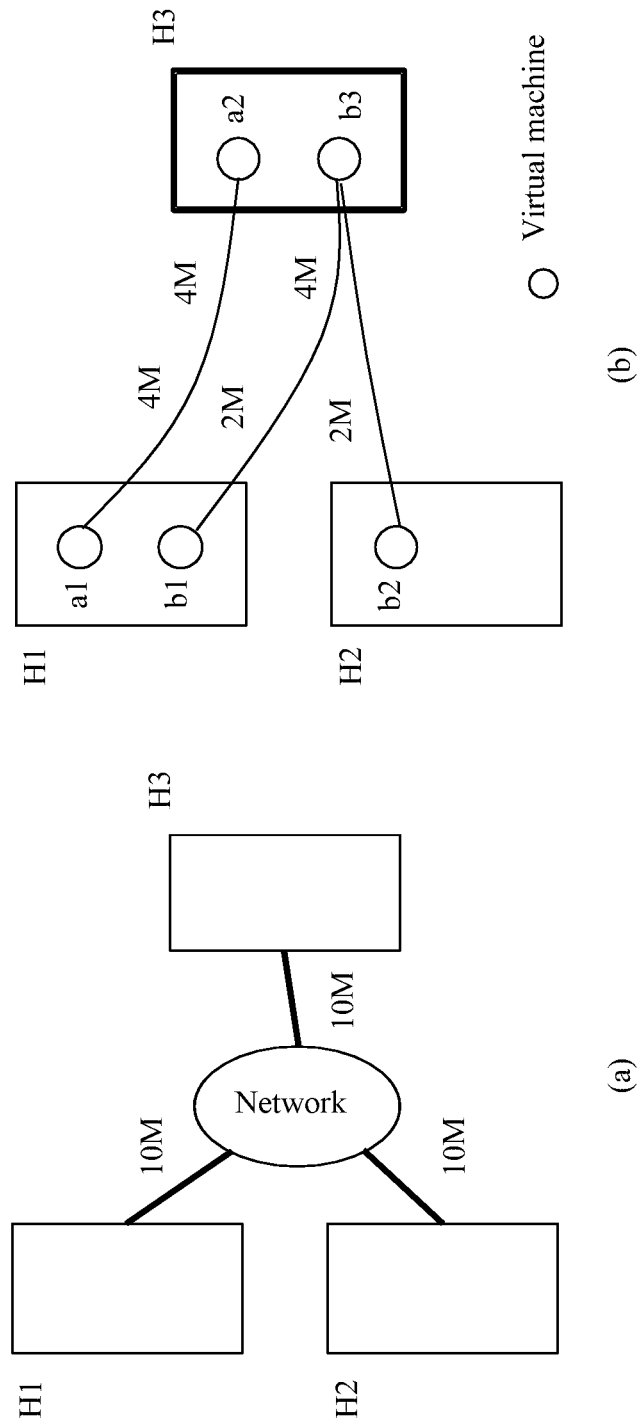
FIG. 7 is a schematic diagram of network flow control according to another embodiment of this application.

Optionally, in an embodiment of this application, the determining target maximum allowed bandwidth of a $j^{th}$ service type on the $i^{th}$ communications entity based on the weight notification message of each communications entity in the plurality of communications entities includes: determining a bottleneck communications entity with greatest current total usage bandwidth from the plurality of communications entities according to current usage bandwidth that is of each service type and that is carried in the weight notification message of each communications entity, where the $j^{th}$ service type exists on the bottleneck communications entity; based on a proportion of current usage bandwidth of each service type on the bottleneck communications entity in the current total usage bandwidth, determining maximum bandwidth of the $j^{th}$ service type on the bottleneck communications entity when maximum available bandwidth of the bottleneck communications entity is totally occupied; and determining the target maximum allowed bandwidth of the $j^{th}$ service type on the $j^{th}$ communications entity based on the maximum bandwidth of the $j^{th}$ service type on the bottleneck communications entity, and a proportion of current usage bandwidth of the $j^{th}$ service type on the $i^{th}$ communications entity to current usage bandwidth of the $j^{th}$ service type on the bottleneck communications entity. FIG. 7 in the following describes specific steps of this embodiment of this application with reference to a specific example.

Specifically, when the target maximum allowed bandwidth of the $i^{th}$ service type on the $i^{th}$ communications entity is being determined, the bottleneck communications entity with greatest current usage bandwidth needs to be found first. When the maximum available bandwidth of the bottleneck communications entity is totally occupied, the maximum bandwidth of the $j^{th}$ service type on the bottleneck communications entity is determined. Further, for the $j^{th}$ service type, a proportional relationship exists between the current usage bandwidth of the bottleneck communications entity and the current usage bandwidth of the $i^{th}$ communications entity. For example, the proportion is 2:1. The maximum allowed bandwidth of the $j^{th}$ service type on the $i^{th}$ communications entity is determined based on the proportional relationship and the maximum bandwidth of the $j^{th}$ service type on the bottleneck communications entity. In this way, if it is determined that the maximum allowed bandwidth of the $j^{th}$ service type on the bottleneck communications entity is 4 Mbit/s, the target maximum allowed bandwidth of the $j^{th}$ service type on the $i^{th}$ communications entity is 2 Mbit/s.

Optionally, in an embodiment of this application, the weight notification message of the $i^{th}$ communications entity in the plurality of communications entities carries current maximum allowed bandwidth of each service type on the $i^{th}$ communications entity, and the method further includes: when current maximum allowed bandwidth configured for the $j^{th}$ service type on the $i^{th}$ communications entity is different from the target maximum allowed bandwidth of the $j^{th}$ service type, sending the target maximum allowed bandwidth of the $j^{th}$ service type to the $i^{th}$ communications entity.

It should be understood that information that may be obtained by mutual deduction between the information and the maximum bandwidth of the $j^{th}$ service type falls within the scope of this application. For example, after the maximum bandwidth weight of the $j^{th}$ service type is determined, the maximum bandwidth of the $j^{th}$ service type can be determined.

The mediation device may compare a current service weight of a target communications entity with an updated service weight of the target communications entity in an instant update manner, in a manner of performing update after a weight difference is calculated to be greater than a preset range, or in a periodic update manner, so as to update the service weight of the target communications entity.

Optionally, in an embodiment of this application, the method further includes: determining a proportion of the target maximum allowed bandwidth of the $j^{th}$ service type to maximum total bandwidth of the $i^{th}$ communications entity as a bandwidth weight of the $j^{th}$ service type.

In this embodiment of this application, a bandwidth weight of each service type can be dynamically determined based on an actual bandwidth occupation status of each service type, so as to achieve optimal utilization of an entire network, and a fair or commercial fair use of a network.

Figure 3:
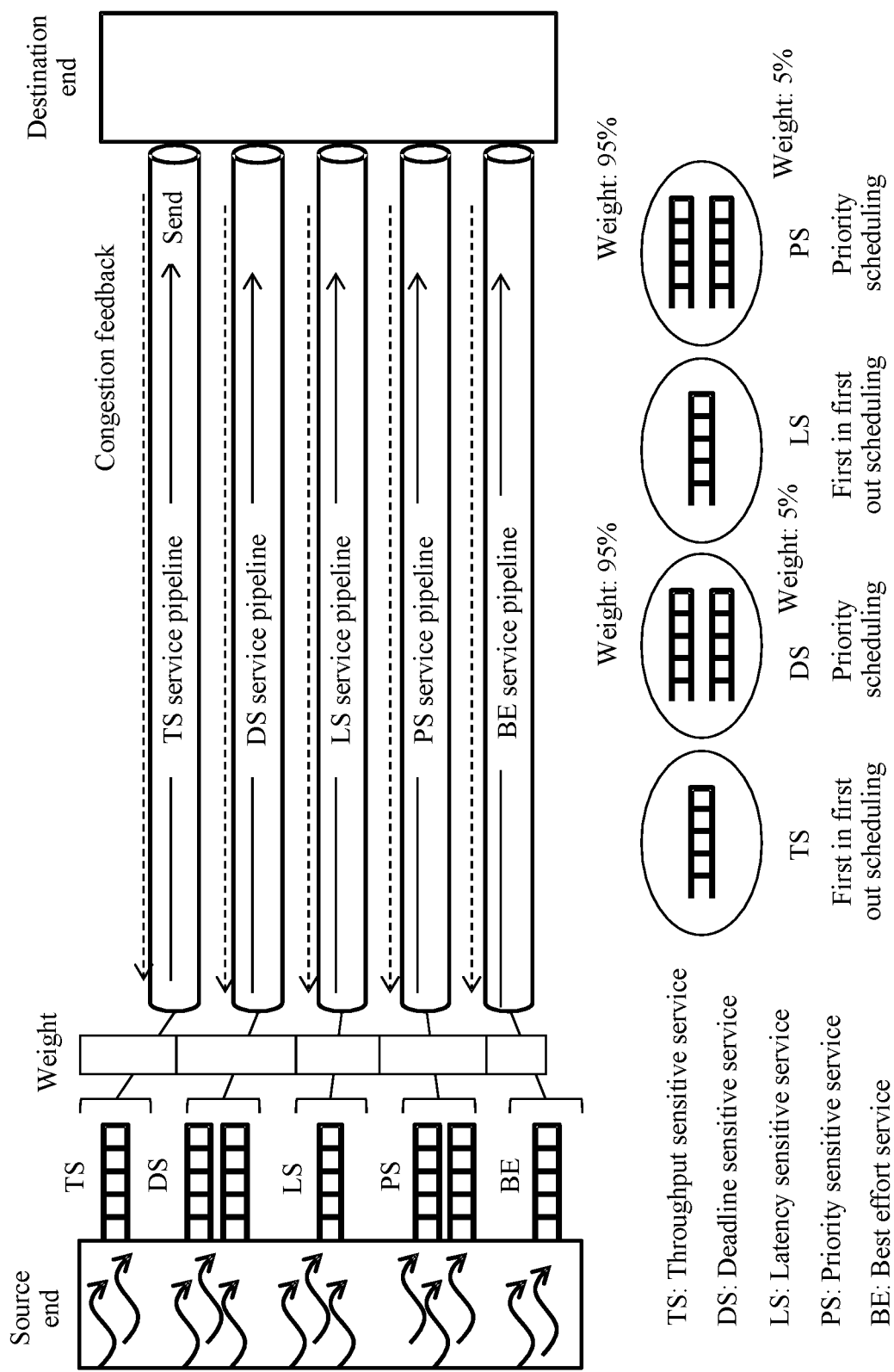
FIG. 3 is a schematic diagram of a data plane according to an embodiment of this application.

FIG. 3 is a schematic diagram of a data plane according to an embodiment of this application.

Based on a service type, packet flows may be classified into the following types: a throughput sensitive (throughput sensitive, TS) service, a deadline sensitive (deadline sensitive, DS) service, a latency sensitive (latency sensitive, LS) service, a priority sensitive (priority sensitive, PS) service, and a best effort (Best Effort, BE) service. Logical pipelines shown in FIG. 3 are established between a destination address and a source address in a network. These logical pipelines are respectively corresponding to different service types, and are respectively a TS service pipeline, a DS service pipeline, an LS service pipeline, a PS service pipeline, and a BE service pipeline. Each service pipeline carries a service flow with a specific corresponding service performance requirement, for example, the TS service pipeline carries a TS service.

Specifically, in the TS service pipeline, the TS service is scheduled in a first in first out (First in first out, FIFO) queue scheduling manner.

In the DS service pipeline, for a DS service, a priority of each packet flow needs to be determined first. The packet flow in the service pipeline is scheduled based on the priority of each packet flow. A service flow with an earlier deadline is corresponding to a higher priority. A higher bandwidth weight may be allocated to a service with a higher priority in the service pipeline. For example, when two queues A and B are used for scheduling, a packet flow with a near deadline is scheduled to enter the queue A, and a remaining packet flow is scheduled to enter the queue B. A bandwidth weight of the queue A is set to 95%, and a bandwidth weight of the queue B is set to 5%. In this way, a packet with a near deadline obtains more bandwidth, thereby improving service performance.

In the LS service pipeline, an LS service is scheduled by using a FIFO queue. When a bandwidth weight of the LS service pipeline is set, bandwidth occupied by the LS service is set to two times a sum of bandwidth of all packet flows, considering that bandwidth for transmitting two packets in a round trip time (Round Trip Time, RTT) needs to be allocated to each packet flow. In addition, a specific burst of the TS service is guaranteed by using a token bucket.

In the PS service pipeline, for a PS service, a priority of each service flow is determined based on a length of each service flow. Generally, a longer length of a service flow leads to a higher priority, and a shorter length of a service flow leads to a lower priority. A higher bandwidth weight may be allocated to a service with a higher priority in the service pipeline.

Independent congestion detection is performed at a destination end of each service pipeline, and a congestion status of the service pipeline may be fed back to a source end. A specific congestion detection method is as follows:

(1) Explicit congestion notification (Explicit Congestion Notification, ECN): The method is specifically that a switch, a router, or the like in a network attaches a congestion mark to a congested packet after detecting congestion, and congestion information is fed back to the source end by the destination end.

(2) The source end adds a packet sequence number to a packet sent to the destination end by using the service pipeline, the destination end detects a lost sequence number to detect a congestion degree, and the destination end feeds back information about the congestion degree to the source end. Alternatively, a maximum link occupation rate of a passed physical link is carried in a packet sent to the destination end, and the destination end feeds back the maximum link occupation rate carried in the packet in the service pipeline to a source end corresponding to a logical pipeline, so as to implement congestion detection.

It should be understood that whether congestion is detected or the congestion degree is determined by specific parameters of different devices. This application is not limited thereto.

Further, the source end determines whether to adjust a transmission rate based on the congestion status fed back by the destination end. Specifically, if no congestion is detected, a higher rate is used tentatively for transmission. Adjustment is performed at an interval of a time period T. It is assumed that a current transmission rate of a $j^{th}$ service pipeline $P_{ij}$ of a service i is $R_{ij}$ (t). A transmission rate $R_{ij}$ (t+T) of the pipeline at a next T is adjusted to:

$$R_{ij}(t+T)=\min(R_{ij}(t)\times(1+w), R_{max}\times w_i), \text{ where}$$

$w_i$ is a total bandwidth proportion value of a source end communications entity of the $i^{th}$ service to which the service pipeline $P_{ij}$ belongs, $0<w_i<1$, and $R_{max}$ is maximum bandwidth of the source end communications entity.

The formula indicates that each pipeline tentatively increases a transmission rate when there is no congestion. An increased value is proportional to a weight of a service represented by each pipeline.

If congestion is detected, the transmission rate is decreased. The transmission rate $R_{ij}$ (t+T) of the pipeline at a next T is adjusted to:

$$R_{ij}(t+T) = R_{ij}(t) \times (1 - \alpha w_i),$$
$$\text{where } \sum_j R_{ij} \geq \min R_i,$$

α represents a congestion degree in the service pipeline $P_{ij}$, greater α indicates more serious congestion, and $0<\alpha<1$. The formula indicates that each pipeline decreases transmission bandwidth based on a proportion of a service to which the pipeline belongs and the congestion degree when there is congestion, but minimum bandwidth min $R_i$ of the pipeline is reserved for each type of service.

Figure 4:
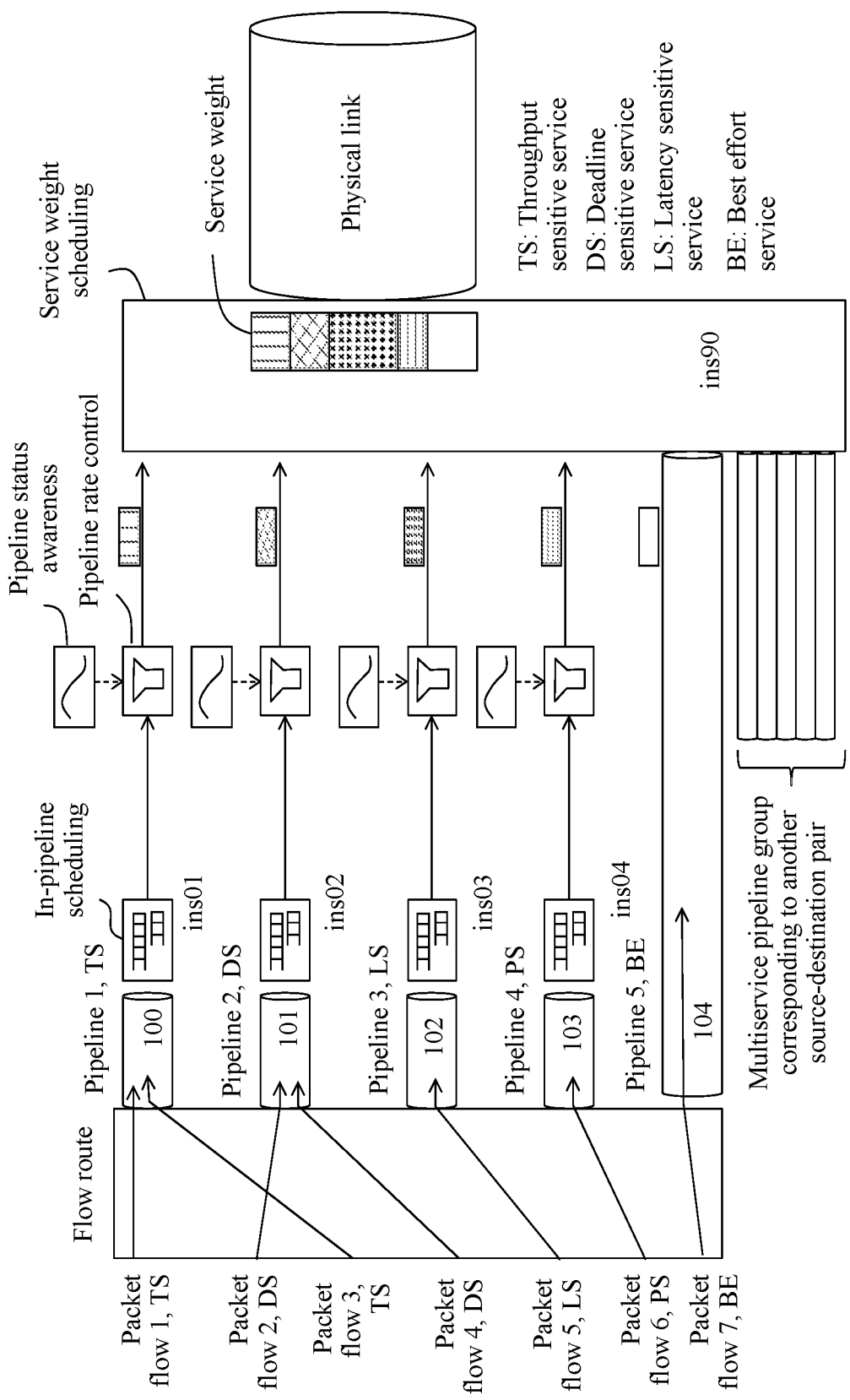
FIG. 4 is a schematic structural diagram of a data plane according to another embodiment of this application.

FIG. 4 is a schematic structural diagram of a data plane according to another embodiment of this application.

FIG. 4 shows a packet flow 1, a packet flow 2, a packet flow 3, a packet flow 4, a packet flow 5, a packet flow 6, and a packet flow 7. The seven packet flows are sent from a same source end to a same destination end.

First, a flow route management module separately forwards the packet flow 1 to the packet flow 7 in the figure to corresponding service pipelines. Specifically, the packet flow 1 and the packet flow 3 are forwarded to a service pipeline 1, and a corresponding service type is a TS service type. The packet flow 2 and the packet flow 4 are forwarded to a service pipeline 2, and a corresponding service type is a DS service type. The packet flow 5 is forwarded to a service pipeline 3, and a corresponding service type is an LS service type. The packet flow 6 is forwarded to a service pipeline 4, and a corresponding service type is a PS service type. The packet flow 7 is forwarded to a service pipeline 5, and a corresponding service type is a BE service type.

An in-pipeline scheduling module is configured to perform packet scheduling in each service pipeline. In a service pipeline, packet scheduling is performed by implementing a specific packet scheduling manner based on a service performance requirement. The manner includes but is not limited to the following manners: first in first out scheduling, recently-received first, shortest-flow-length first, high-priority first, and the like.

A pipeline status awareness module is configured to receive a congestion status notification message sent by a destination end of a pipeline, and notify a pipeline rate notification module of the message. Based on a specific rate control algorithm, the pipeline rate notification module increases or decreases a pipeline transmission rate according to pipeline congestion information provided by the pipeline status awareness module. Alternatively, the pipeline status awareness module is configured to calculate a new pipeline rate based on congestion information sent by the destination end of the pipeline, and adjust a related parameter of a pipeline rate control module based on the new pipeline rate, so that the pipeline rate control module adjusts a pipeline rate.

The pipeline rate control module is configured to increase or decrease, based on a specific rate control algorithm such as a leaky bucket (leaky bucket) algorithm, the pipeline transmission rate based on the pipeline congestion information provided by the pipeline status awareness module. This application is not limited thereto.

A service weight scheduling module is configured to implement network resource sharing according to preset service weight proportions. For example, the service weight scheduling module may set N queues for N services, and schedule the N queues in a weighted fair queuing manner. In a scheduling period, a quantity of scheduling times of each queue or a quantity of scheduled packet bytes of each queue is proportional to a service network weight corresponding to the queue.

According to the schematic diagram of implementing a data plane shown in FIG. 4, a specific process of packet flow processing is as follows: The flow route module processes a service packet flow to search a pipeline table shown in Table 1 based on a packet source address and destination address, so as to obtain information about the service packet such as a pipeline source address, a pipeline destination address, a pipeline number, and a corresponding output physical port number. Pipeline encapsulation is performed on the service packet based on a table lookup result. That is, the pipeline source address, the pipeline destination address, and pipeline number information are added to a header of the packet, and the packet is sent to a corresponding physical link and a corresponding pipeline scheduling module.

A best effort packet or another packet whose service type cannot be identified is directly sent to a service weight scheduling module corresponding to an output physical link.

TABLE 1

| Source Address | Destination Address | Service Type | Pipeline Source Address | Pipeline Destination Address | Pipeline Number | Output Physical Port Number | Pipeline Processing Channel Number/ Instance Number |
|---|---|---|---|---|---|---|---|
| Flow1-s | Flow1-d | TS | A | B | 100 | p1 | ins01 |
| Flow2-s | Flow2-d | DS | A | B | 101 | p1 | ins02 |
| Flow3-s | Flow3-d | TS | A | B | 100 | p1 | ins01 |
| Flow4-s | Flow4-d | DS | A | B | 101 | p1 | ins02 |
| Flow5-s | Flow5-d | LS | A | B | 102 | p1 | ins03 |

TABLE 1-continued

| Source Address | Destination Address | Service Type | Pipeline Source Address | Pipeline Destination Address | Pipeline Number | Output Physical Port Number | Pipeline Processing Channel Number/ Instance Number |
|---|---|---|---|---|---|---|---|
| Flow6-s | Flow6-d | PS | A | B | 103 | p1 | ins04 |
| Flow7-s | Flow7-d | — | A | B | 104 | p1 | ins90 |

It is assumed that communications entities A and B are two hosts, and from A to B, there are seven service flows shown in Table 1: a flow 1, a flow 2, . . . , and a flow 7. For example, specifically, a source address of a packet corresponding to the flow 1 is a virtual machine address flow 1-s of the host A, and a destination address of the packet corresponding to the flow 1 is a virtual machine address flow 1-d of the host B. A service type corresponding to the flow 1 is a TS type. The following may be obtained by searching Table 1: A pipeline source address is a communication address of the host A, a pipeline destination address is a communication address of the host B, a pipeline number of a corresponding service pipeline is 100, an output physical port number is p1, and a pipeline processing channel number is ins01.

Further, the flow route module encapsulates the packet in a service pipeline whose source address is A, destination address is B, and pipeline number is 100, and sends the packet to a channel whose pipeline processing channel number is ins01 for further processing. In Table 1, the pipeline processing channel number is mainly based on a channel in a hardware processing manner corresponding to an implementation, and the instance number is mainly based on a process, a central processing unit (Central Processing Unit, CPU) core, or a resource scheduling fragment in a software processing manner corresponding to an implementation. It should be understood that processing manners of the flow 2 to the flow 6 are similar to the processing manner of the flow 1, and details are not described herein. For the flow 7, because there is no service type information of the flow in the table, a packet of the flow is processed based on the BE type, and is directly sent to the service weight scheduling module.

Specifically, a packet of the flow 1 enters the pipeline 100. In-pipeline scheduling is first performed in the channel whose channel number is ins01. The packet type is TS, and FIFO scheduling may be used. Then, rate control is performed in the pipeline rate control module. The packet of the flow 1 is sent to the service weight scheduling module to implement weight scheduling at a service level, and finally is sent to a physical link.

Specifically, a packet of the flow 2 enters a pipeline 101. In-pipeline scheduling is first performed in a channel whose channel number is ins02. The packet type is DS, and a double queue manner may be used. Weights with a relatively large difference are set for two queues, for example, a weight of one queue is set to 95%, and a weight of the other queue is set to 5%. A packet of a flow with a near deadline enters a queue with a large weight, and a packet of a flow with a far deadline enters a queue with a small weight. Alternatively, in another manner, two queues may use a scheduling manner with different priorities. A high priority is set for one queue, and a low priority is set for the other queue. A packet of a flow with a near deadline enters the queue with the high priority, and a packet of a flow with a far deadline enters the queue with the low priority.

For packets of the flow 3 to the flow 6, processing manners are similar to those of the flow 1 and the flow 2, and details are not described herein. Because the flow 7 does not belong to a specific service type, the flow 7 is directly sent to the service weight scheduling module in a best effort manner. That is, in ins90, the flow 7 is scheduled based on a weight occupied by the BE service type.

It should be understood that a plurality of service pipelines for a same type of service may assemble in the weight scheduling module, because service pipelines to different destination communications entities may exist in a same physical link. In this case, these packets from different service pipelines may receive, in a centralized manner, bandwidth weights allocated by the service weight scheduling module and share a network resource.

Service type information corresponding to a packet flow may be obtained by using the following methods:

1. When an application is deployed, a cloud management system or an SDN controller configures a service type on a channel entity.

2. An application type is inferred by using a common port number, for example, an FTP signaling port number TCP 21, a DNS port number UDP 67, or an HTTP port number TCP 80.

3. After a service type of a packet flow is identified by using a technology such as DPI, service type information of the packet flow is fed back to a communications entity.

Figure 5:
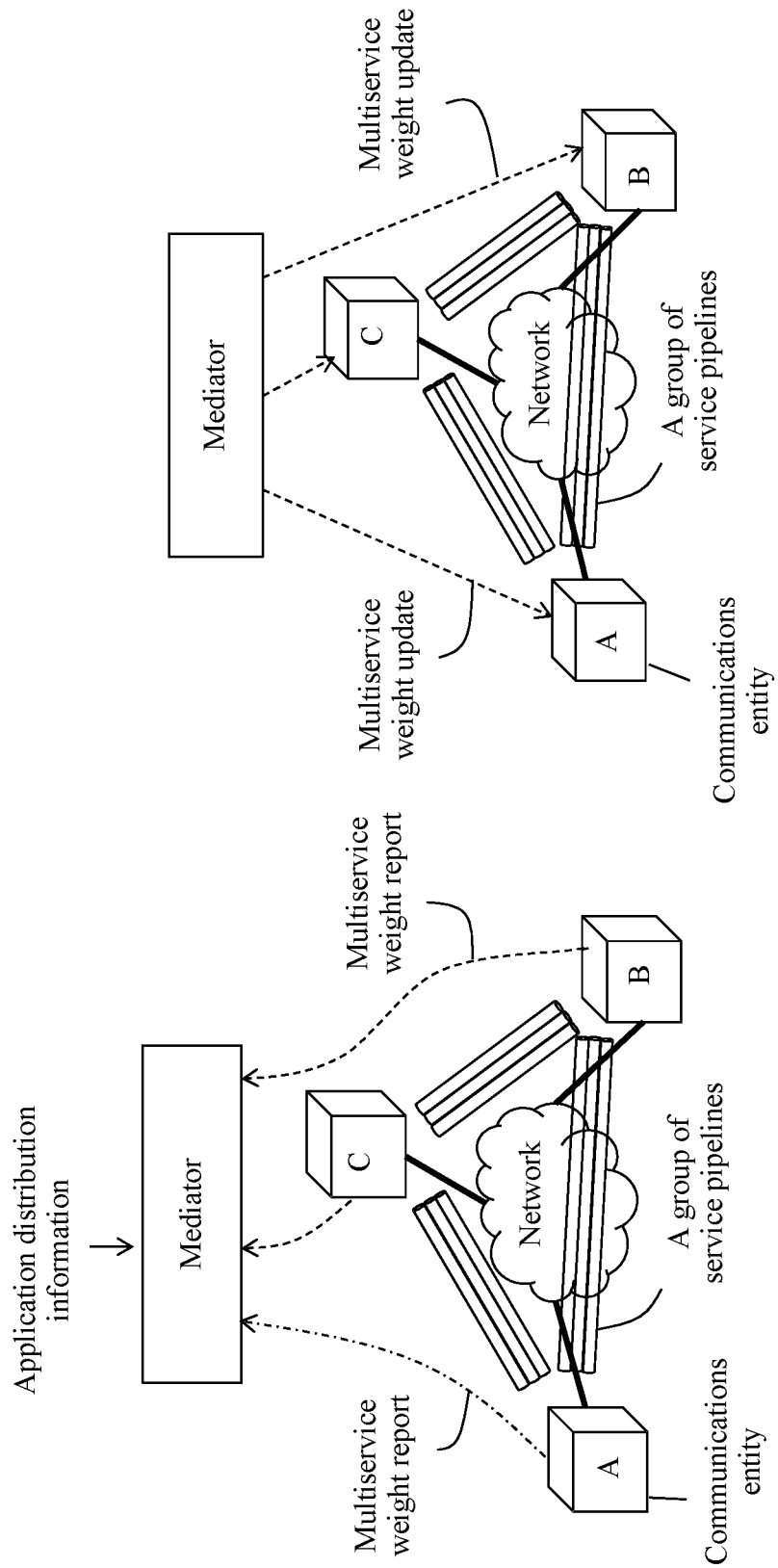
FIG. 5 is a schematic diagram of flow control according to another embodiment of this application.

FIG. 5 is a schematic diagram of flow control according to another embodiment of this application.

As shown in FIG. 5, a communications entity A, a communications entity B, and a communications entity C may communicate with each other by using a network. The three communications entities may report network bandwidth occupation weights of their respective services to a mediator. The mediator collects network weight occupation rates of the services of the communications entities distributed on a network edge, uses distribution information of applications that are in the communications entities on the network edge to determine bandwidth bottleneck points of the applications and calculate optimal bandwidth weights of the services in the communications entities, and delivers bandwidth weight information of each service type on the communications entities to each corresponding communications entity, so as to maximize network utilization.

Figure 6:
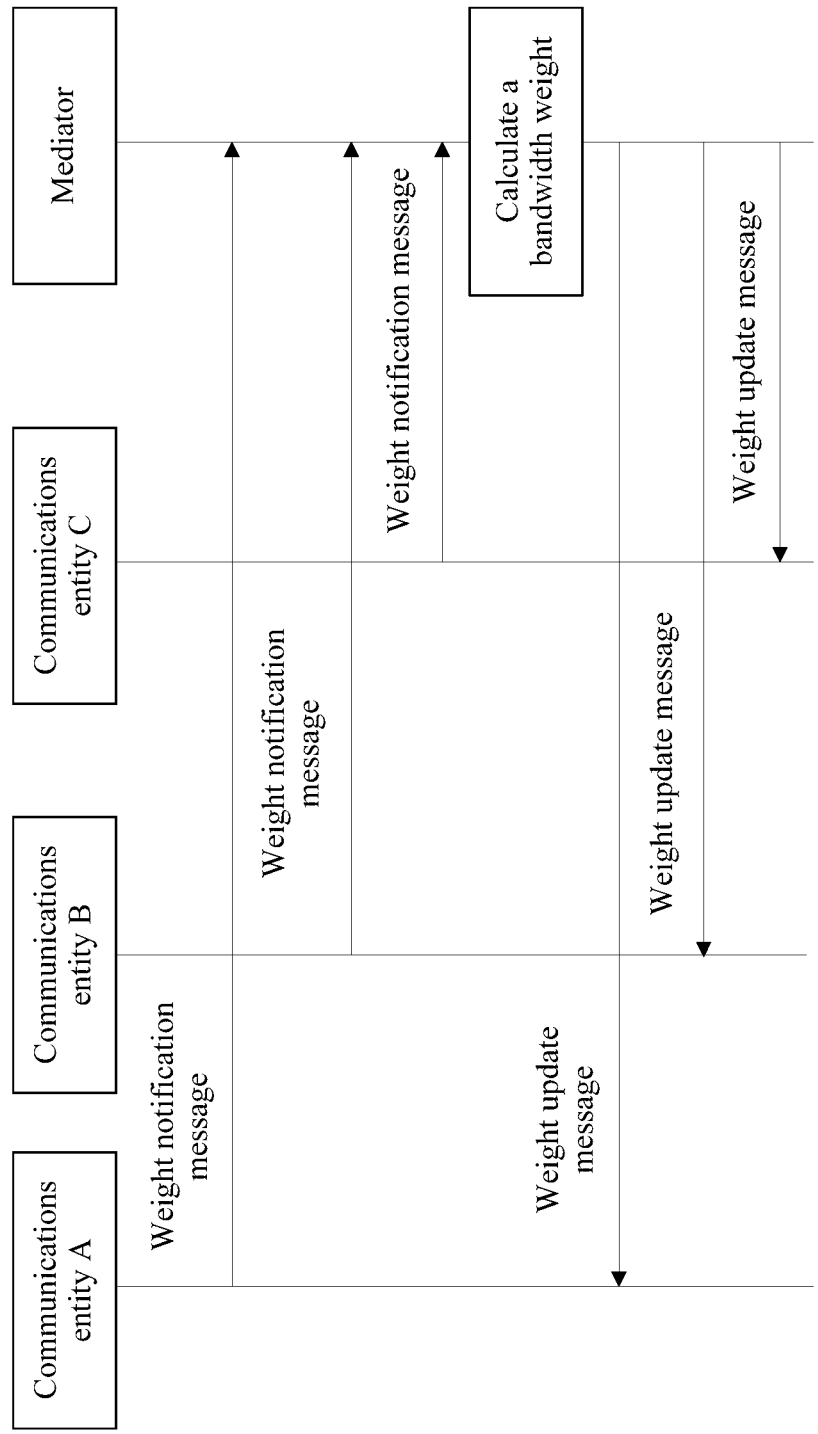
FIG. 6 is a schematic flowchart of flow control according to still another embodiment of this application.

FIG. 6 is a schematic flowchart of flow control according to still another embodiment of this application.

As shown in FIG. 6, first, a communications entity A, a communications entity B, and a communications entity C separately send a weight notification message to a mediator. Specifically, a weight notification message of the communications entity A includes at least: (current usage bandwidth of each service on the communications entity A includes current transmit bandwidth and current receive bandwidth) maximum bandwidth of the communications entity A and a current bandwidth weight configured for each service type on the communications entity A. The weight notification message of the communications entity A may further include the following information: a physical port identifier of the communications entity A, an identifier or an address of the communications entity A, a destination communications entity identifier or address of each service packet flow on the communications entity A, a service pipeline identifier of the communications entity A, and a service type carried in each service pipeline on the communications entity A.

Further, the mediator calculates target bandwidth weights of the communications entities based on the weight notification messages of the communications entity A, the communications entity B, and the communications entity C. For example, an application driven network sharing (Application Driven Network Sharing, ADNS) algorithm shown below may be used.

A bandwidth weight value of a service type S on a host host is calculated.

```
1)   int Weight(currh,S)
2)   {
3)     Host maxh=NULL;BW b=0;BW maxquota=0; SET hSet =Null;
4)       for each a:application (a.type==S and a.location==currh)
5)         set H=GetHosts (a); //obtain all hosts that run a
6)           for each h in H
7)             if B(h)>b then maxh=h;
8)           end for
9)           if maxh not in hSet {
10)            maxquota+= Bw(S, maxh)*Total(currh)/Total(maxh);
11)            hSet.push(maxh);
12)          }
13)      end for
14)      return ceil(maxquota/Total(currh)*100);
15)  }
```

Notes:

GetHosts(app): indicates a set of hosts that run an application.

B(host): indicates current total bandwidth occupied on a host.

Bw(S,host): indicates a current bandwidth value of an application type S on a host.

Total (host): indicates total physical bandwidth of a host.

In the third line, Host maxh=NULL indicates that a bottleneck host is undefined; BW b=0 indicates that an initial bandwidth value is set to 0; BW maxquota=0 indicates that an initial bandwidth weight value is set to 0; and SET hSet =Null maxh indicates that maximum allowed bandwidth is undefined.

In the fourth line, all applications that belong to the service type S and run on a current host host are determined, and hosts in which these applications are distributed are traversed.

In the fifth line, an application a is used as an example. The fifth line indicates that information about all hosts that run the application a is obtained by using deployment information or the like of the application. The application deployment information may be obtained from a cloud management software module. This application is not limited thereto.

In the sixth to the eighth lines, a host with greatest occupied bandwidth, referred to as a bottleneck host maxh, is found from hosts in which the current application a is distributed.

In the ninth to the tenth lines, first, target maximum allowed bandwidth of the application a on the bottleneck host is determined based on a bandwidth occupation proportion of the application a on the bottleneck host maxh and maximum total bandwidth of the bottleneck host maxh. Further, target maximum allowed bandwidth of the application a on the current host currh is calculated based on a ratio of occupied bandwidth of the application a on the bottleneck host maxh to occupied bandwidth of the application a on the current host currh. The current host is a target host on which target bandwidth is expected to be determined.

In the ninth to the twelfth lines, for all applications belonging to the service S, bandwidth values that are of the corresponding applications on the current host (target host) and that are calculated by using the foregoing method are added together, and target bandwidth of the service S on the current host (target host) may be finally calculated, that is, a bandwidth weight of the service S on the current host may be obtained.

FIG. 7 is a schematic diagram of network flow control according to another embodiment of this application. As shown in FIG. 7, three hosts are respectively H1, H2, and H3. The three hosts are connected by using a network. The three hosts are connected to the network with 10 Mbit/s physical bandwidth each. That is, maximum physical bandwidth of each of the three hosts is 10 Mbit/s. As shown in FIG. 7(b), it is assumed that there are two applications A and B. The two applications belong to different services. Virtual machines related to the application A are a1 and a2, and virtual machines related to the application B are b1, b2, and b3. For the application A, the virtual machine a1 is deployed on H1, and the virtual machine a2 is deployed on H3. For the application B, the three virtual machines b1, b2, and b3 are respectively deployed on H1, H2, and H3. Communication relationships between the virtual machines are shown in the figure. Current occupied communication bandwidth from a1 to a2 is 4 Mbit/s, and current occupied communication bandwidth from b1 to b3 and current occupied communication bandwidth from b2 to b3 are separately 2 Mbit/s.

It is assumed that a target host is H1. When a network weight value of a service type to which the application A of the host H1 belongs is calculated, the application a1 may be first found, and a1 is related to the two hosts H1 and H3. In the two hosts, a host that occupies greatest bandwidth is H3. A maximum possible occupied bandwidth of the application A on H3 is determined. For example, if bandwidth occupied by the application A and bandwidth occupied by the application B on H3 are respectively 4 Mbit/s and 4 Mbit/s, a proportion of the two service types is 1:1. If maximum physical bandwidth of H3 is 10 Mbit/s, when the maximum physical bandwidth of H3 is totally occupied, bandwidth occupied by the application A on H3 is 5 Mbit/s. Based on a current proportion of occupied bandwidth of the application A on H1 to occupied bandwidth of the application A on H3 (because bandwidth occupied by a1 on H1 is 4 Mbit/s, and bandwidth occupied by a2 on H3 is 4 Mbit/s, the proportion of occupied bandwidth of the application A on H1 to occupied bandwidth of the application A on H3 is 1:1), it can be deduced that bandwidth occupied by the application A on H1 is also 5 Mbit/s, that is, target bandwidth of the application A on H1 and target bandwidth of the application A on H3 are both 5 Mbit/s. Similarly, target bandwidth of the application B on H3 may be deduced to be 5 Mbit/s in a same manner, and target bandwidth of the application B on H1 is further determined to be 2.5 Mbit/s. Similarly, target bandwidth of the application B on H2 is 2.5 Mbit/s. On a communications entity, except for a service with a specific service type, a service whose service type cannot be determined may be referred to as a best effort BE service. Target bandwidth of BE is a difference between total bandwidth of the communications entity and target bandwidth of another specific service type. Therefore, the following may be finally obtained: On H1, an occupation proportion of A, B, and BE is 0.5:0.25:0.25, and on H3, an occupation proportion of A, B, and BE is 0.5:0.5:0. In practice, extremely small bandwidth min is reserved for a service type whose proportion is 0. It can be learned from the example that for H1, because there is another bottle, a system may not allow the applications A and B on H1 to occupy full bandwidth, so as to reserve more resources for another application to use, thereby improving bandwidth utilization of the entire network.

The foregoing describes in detail the network flow control methods according to the embodiments of this application with reference to FIG. 1 to FIG. 7, and the following describes in detail network devices according to embodiments of this application with reference to FIG. 8 to FIG. 11.

Figure 8:
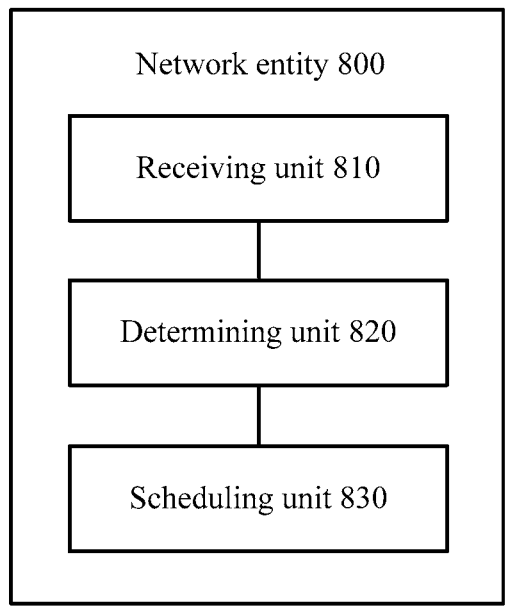
FIG. 8 is a network entity according to an embodiment of this application.

FIG. 8 is a network entity according to an embodiment of this application. As shown in FIG. 8, the network entity 800 includes:

a receiving unit 810, where the receiving unit 810 is configured to receive a packet flow;

a determining unit 820, where the determining unit 820 is configured to determine, based on a service type of the packet flow, a service pipeline used for transmitting the packet flow, where service types of all packet flows in the service pipeline are the same; and a scheduling unit 830, where the scheduling unit 830 is configured to: based on a bandwidth weight allocated to the service type, send the packet flow in the service pipeline to a physical port.

In this embodiment of this application, packet flows are allocated to different service pipelines based on a service type, and bandwidth weights are allocated, in a centralized manner, to service pipelines that carry a same service type. Therefore, each service pipeline can schedule packet flows in the service pipeline based on a bandwidth weight allocated to a specific service type, so as to avoid mutual interference generated between packet flows of different service types. Separate configuration may be performed to meet performance requirements of service flows of different service types.

Optionally, in an embodiment of this application, the scheduling unit 830 is further configured to: perform in-pipeline scheduling on the packet flows in the service pipeline based on the service type of the packet flow in the service pipeline.

Optionally, in an embodiment of this application, the scheduling unit 830 is specifically configured to: when the service type of the packet flow in the service pipeline is a throughput sensitive service, perform scheduling on the packet flows in the service pipeline in a first in first out queue scheduling manner; when the service type of the packet flow in the service pipeline is a deadline sensitive service, determine a priority of each packet flow based on a deadline of each service flow in the service pipeline, and schedule each packet flow based on the priority of each packet flow, where a service flow with an earlier deadline is corresponding to a higher priority; when the service type of the packet flow in the service pipeline is a latency sensitive service, perform scheduling on the packet flows in the service pipeline in a first in first out queue scheduling manner; or when the service type of the packet flow in the service pipeline is a priority sensitive service, determine a priority of each packet flow in the service pipeline, and schedule each packet flow based on the priority of each packet flow.

Optionally, in an embodiment of this application, the determining unit 820 is further configured to: determine a transmission rate of the packet flow in the service pipeline based on a congestion status of the service pipeline and the bandwidth weight allocated to the service type.

Optionally, in an embodiment of this application, the determining unit 820 is specifically configured to: when the service pipeline is in a non-congested state, increase a transmission rate $R(t)$ of the packet flow in the service pipeline at a moment t by using the following formula:

$R(t)=\min(R(t-T)\times(1+w), R_{max}\times w)$, where a transmission rate of the service pipeline at a moment t−T is $R(t-T)$, the bandwidth weight allocated to the service type is w, and maximum bandwidth that can be occupied by the service pipeline is $R_{max}$; or when the service pipeline is in a congested state, determine a transmission rate $R(t)$ of the packet flow in the service pipeline at a moment t by using the following formula:

$R(t)=R(t-T)\times(1-\alpha w)$, where a transmission rate of the service pipeline at a moment t−T is $R(t-T)$, the bandwidth weight allocated to the service type is w, and a congestion degree of the service pipeline is $\alpha$, $0<\alpha<1$.

Optionally, in an embodiment of this application, the communications entity further includes: a sending unit, where the sending unit is configured to send a weight notification message to a mediation device, and the weight notification message carries current usage bandwidth of each service type on the communications entity.

It should be understood that the communications entity 800 in this embodiment of this application may be corresponding to the communications entity that performs the method 100 in the embodiment of this application, and the foregoing and other operations and/or functions of the units in the communications entity 800 are respectively used for implementing procedures corresponding to the communications entity device in the method in FIG. 1. For brevity, details are not described herein.

In this embodiment of this application, packet flows are allocated to different service pipelines based on a service type, and bandwidth weights are allocated, in a centralized manner, to service pipelines that carry a same service type. Therefore, each service pipeline can schedule packet flows in the service pipeline based on a bandwidth weight allocated to a specific service type, so as to avoid mutual interference generated between packet flows of different service types. Separate configuration may be performed to meet performance requirements of service flows of different service types.

Figure 9:
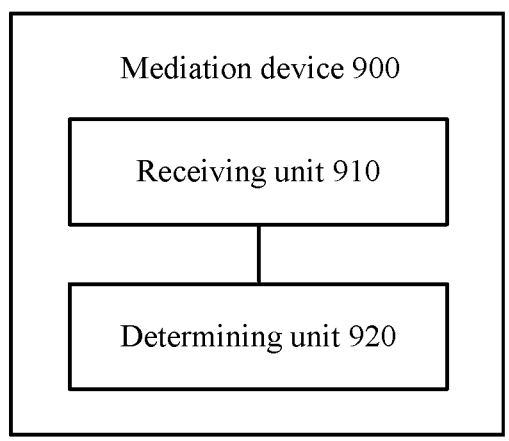
FIG. 9 is a mediation device according to an embodiment of this application.

FIG. 9 is a mediation device according to an embodiment of this application. As shown in FIG. 9, the mediation device 900 includes:

a receiving unit 910, where the receiving unit 910 is configured to receive a weight notification message of each communications entity in a plurality of communications entities, and a weight notification message of an $i^{th}$ communications entity in the plurality of communications entities carries current usage bandwidth of each service type on the $i^{th}$ communications entity; and a determining unit 920, where the determining unit 920 is configured to determine target maximum allowed bandwidth of a $j^{th}$ service type on the $i^{th}$ communications entity based on the weight notification message of each communications entity in the plurality of communications entities. Optionally, in an embodiment of this application, the determining unit 920 is specifically configured to: determine a bottleneck communications entity with greatest current total usage bandwidth from the plurality of communications entities according to current usage bandwidth that is of each service type and that is carried in the weight notification message of each communications entity, where the $j^{th}$ service type exists on the bottleneck communications entity; based on a proportion of current usage bandwidth of each service type on the bottleneck communications entity in the current total usage bandwidth, determine maximum allowed bandwidth of the $j^{th}$ service type on the bottleneck communications entity when maximum available bandwidth of the bottleneck communications entity is totally occupied; and determine the target maximum allowed bandwidth of the $j^{th}$ service type on the $i^{th}$ communications entity based on the maximum bandwidth of the $j^{th}$ service type on the bottleneck communications entity, and a proportion of current usage bandwidth of the $j^{th}$ service type on the $i^{th}$ communications entity to current usage bandwidth of the $j^{th}$ service type on the bottleneck communications entity.

Optionally, in an embodiment of this application, the mediation device further includes: a sending unit, where the sending unit is configured to send the target maximum allowed bandwidth of the $j^{th}$ service type to the $i^{th}$ communications entity.

Optionally, in an embodiment of this application, the determining unit 920 is further configured to determine a proportion of the target maximum bandwidth of the $j^{th}$ service type to maximum total bandwidth of the $i^{th}$ communications entity as a bandwidth weight of the $i^{th}$ service type.

It should be understood that the mediation device 900 in this embodiment of this application may be corresponding to the mediation device that performs the method 200 in the embodiment of this application, and the foregoing and other operations and/or functions of the units in the mediation device 900 are respectively used for implementing procedures corresponding to the communications entity device in the method in FIG. 2. For brevity, details are not described herein.

In this embodiment of this application, a bandwidth weight of each service type can be dynamically determined according to an actual bandwidth occupation status of each service type, so as to achieve optimal utilization of an entire network, and a fair or commercial fair use of a network.

Figure 10:
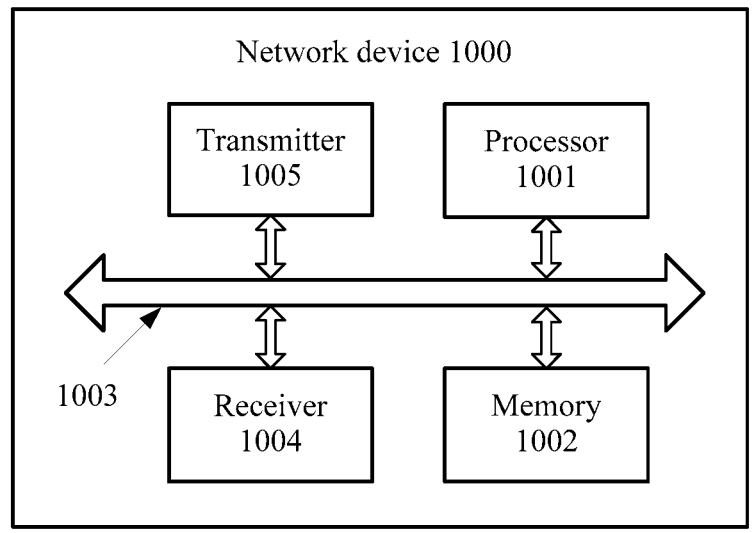
FIG. 10 is a network device according to another embodiment of this application.

FIG. 10 is a network device according to another embodiment of this application. As shown in FIG. 10, this embodiment of this application further provides a network device 1000. The network device 1000 includes a processor 1001, a memory 1002, a bus system 1003, and a receiver 1004. The processor 1001, the memory 1002, and the receiver 1004 are connected by using the bus system 1003. The memory 1002 is configured to store an instruction, and the processor 1001 is configured to execute the instruction stored in the memory 1002, and control the receiver 1004 to receive information. The network device 1000 can implement a corresponding procedure in the foregoing method embodiment. To avoid repetition, details are not described herein.

It should be understood that in this embodiment of this application, the processor 1001 may be a central processing unit (Central Processing Unit, CPU), or the processor 1001 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor, or the like.

The memory 1002 may include a read-only memory and a random access memory, and provides data and an instruction for the processor 1001. A part of the memory 1002 may further include a nonvolatile random access memory. For example, the memory 1002 may further store information about a device type.

In addition to a data bus, the bus system 1003 may further include a power bus, a control bus, a status signal bus, and the like. However, for clarity of description, various buses are marked as the bus system 1003 in the figure.

In an implementation process, the steps in the foregoing methods may be completed by means of an integrated logic circuit of hardware in the processor 1001 or an instruction in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information in the memory 1002, and completes the steps of the foregoing methods in combination with hardware of the processor 1001. To avoid repetition, details are not described herein.

Figure 11:
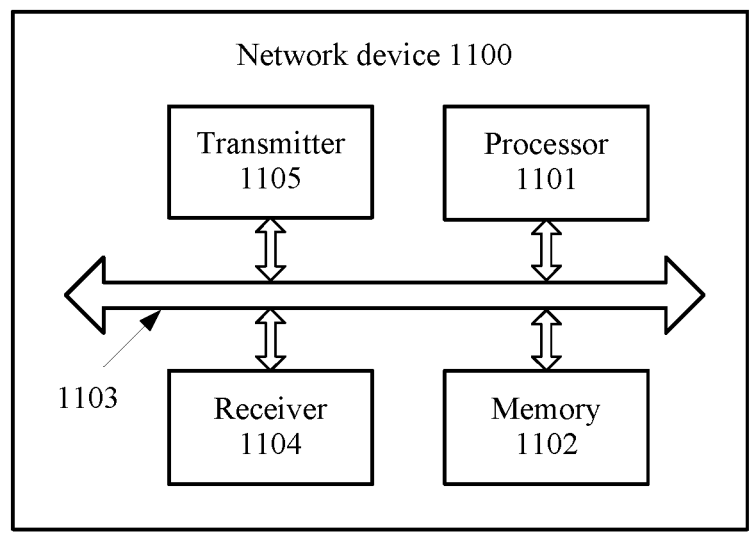
FIG. 11 is a network device according to another embodiment of this application.

FIG. 11 is a network device according to another embodiment of this application. As shown in FIG. 11, this embodiment of this application further provides a network device 1100. The network device 1100 includes a processor 1101, a memory 1102, a bus system 1103, and a receiver 1104. The processor 1101, the memory 1102, and the receiver 1104 are connected by using the bus system 1103. The memory 1102 is configured to store an instruction, and the processor 1101 is configured to execute the instruction stored in the memory 1102, and control the receiver 1104 to receive information. The network device 1100 can implement a corresponding procedure in the foregoing method embodiment. To avoid repetition, details are not described herein.

It should be understood that in this embodiment of this application, the processor 1101 may be a central processing unit (Central Processing Unit, CPU), or the processor 1101 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor, or the like.

The memory 1102 may include a read-only memory and a random access memory, and provides data and an instruction for the processor 1101. A part of the memory 1102 may further include a nonvolatile random access memory. For example, the memory 1102 may further store information about a device type.

In addition to a data bus, the bus system 1103 may further include a power bus, a control bus, a status signal bus, and the like. However, for clarity of description, various buses are marked as the bus system 1103 in the figure.

In an implementation process, the steps in the foregoing methods may be completed by means of an integrated logic circuit of hardware in the processor 1101 or an instruction in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1102. The processor 1101 reads information in the memory 1102, and completes the steps of the foregoing methods in combination with hardware of the processor 1101. To avoid repetition, details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network flow control method, comprising:
   receiving a packet flow;
   determining, based on a service type of the packet flow, a service pipeline used for transmitting the packet flow, wherein service types of all packet flows in the service pipeline are the same;
   determining a multiplier based on a congestion status of the service pipeline, wherein:
      if the service pipeline is in a non-congested state, the multiplier is (1+W), wherein W is a bandwidth weight allocated to the service type; or
      if the service pipeline is in a congested state, the multiplier is (1−αW), wherein W is the bandwidth weight allocated to the service type, wherein α is a congestion degree of the service pipeline, and wherein 0<α<1;
   determining a product by multiplying the multiplier and a transmission rate of the service pipeline at a first moment;
   determining, based on the product, a transmission rate of the service pipeline at a second moment, wherein the first moment is earlier than the second moment; and
   based on the bandwidth weight allocated to the service type and the transmission rate of the service pipeline at the second moment, transferring the packet flow using the service pipeline.

2. The method according to claim 1, wherein before the transferring the packet flow using the service pipeline, the method further comprises:
   determining in-pipeline scheduling on the packet flows in the service pipeline based on the service type of the packet flow in the service pipeline, wherein the in-pipeline scheduling on the packet flows in the service pipeline is specified for the service pipeline and is different from another in-pipeline scheduling on other packet flows in another service pipeline, wherein the other packet flows in the another service pipeline are all of another service type that is different from the service type; and
   performing the in-pipeline scheduling on the packet flows in the service pipeline based on the service type of the packet flow in the service pipeline.

3. The method according to claim 2, wherein the performing the in-pipeline scheduling on the packet flows in the service pipeline based on the service type of the packet flow in the service pipeline comprises one of the following:
   if the service type of the packet flow in the service pipeline is a throughput sensitive service, performing scheduling on the packet flows in the service pipeline in a first in first out queue scheduling manner;

if the service type of the packet flow in the service pipeline is a deadline sensitive service, determining a priority of each packet flow based on a deadline of each service flow in the service pipeline, and scheduling each packet flow based on the priority of each packet flow, wherein a service flow with an earlier deadline is corresponding to a higher priority;

if the service type of the packet flow in the service pipeline is a latency sensitive service, performing scheduling on the packet flows in the service pipeline in a first in first out queue scheduling manner; or if the service type of the packet flow in the service pipeline is a priority sensitive service, determining a priority of each packet flow in the service pipeline, and scheduling each packet flow based on the priority of each packet flow.

4. The method according to claim 1, wherein the method further comprises:

determining the transmission rate of the service pipeline based on the congestion status of the service pipeline.

5. The method according to claim 4, wherein the first moment is t−T, wherein the second moment is t, wherein the determining a transmission rate of the service pipeline based on the congestion status of the service pipeline comprises:

if the service pipeline is in the non-congested state, determining a transmission rate R(t) of the packet flow in the service pipeline at the second moment t by using the following formula:

$R(t)=\min(R(t-T)\times(1+w), R_{max}\times w)$, wherein the transmission rate of the service pipeline at the first moment t−T is R(t−T), and maximum bandwidth that can be occupied by the service pipeline is $R_{max}$; or if the service pipeline is in the congested state, determining a transmission rate R(t) of the service pipeline at the second moment t by using the following formula:

$R(t)=R(t-T)\times(1-\alpha w)$, wherein the transmission rate of the service pipeline at the first moment t−T is R(t−T).

6. The method according to claim 1, wherein the method is performed by a communications device, and the method further comprises:

sending, by the communications device, a weight notification message to a mediation device, wherein the weight notification message carries current usage bandwidth of each service type on the communications device; and receiving a weight notification response fed back by the mediation device, wherein the weight notification response carries a target bandwidth weight of each service type.

7. A network flow control method, comprising:

receiving a weight notification message of each communications device in a plurality of communications devices, wherein a weight notification message of an $i^{th}$ communications device in the plurality of communications devices carries current usage bandwidth of each service type on the $i^{th}$ communications device;

determining a bottleneck communications device from the plurality of communications devices, wherein each communications device of the plurality of communications devices has a corresponding current total usage bandwidth that is determined based on current usage bandwidth of each service type indicated in a corresponding weight notification message of the communications device, wherein the bottleneck communications device has the greatest current total usage bandwidth among the plurality of communications devices, wherein $j^{th}$ service type exists on the bottleneck communications device;

determining a maximum allowed bandwidth of the $j^{th}$ service type on the bottleneck communications device;

dividing a first bandwidth by a second bandwidth to determine a ratio, wherein the first bandwidth is a current usage bandwidth of the $j^{th}$ service type on the $i^{th}$ communications device, wherein the second bandwidth is a current usage bandwidth of the $j^{th}$ service type on the bottleneck communications device, wherein the bottleneck communications device is different from the $i^{th}$ communications device; and determining target maximum allowed bandwidth of a $j^{th}$ service type on the $i^{th}$ communications device by multiplying the ratio and the maximum allowed bandwidth of the $j^{th}$ service type on the bottleneck communications device, wherein a packet flow of the $j^{th}$ service type is transmitted in a service pipeline of the $i^{th}$ communications device, wherein service types of all packet flows in the service pipeline are the same.

8. The method according to claim 7, wherein the determining target maximum allowed bandwidth of a $j^{th}$ service type on the $i^{th}$ communications device comprises:

based on a proportion of current usage bandwidth of each service type on the bottleneck communications device in a current total usage bandwidth, determining the maximum allowed bandwidth of the $j^{th}$ service type on the bottleneck communications device when maximum available bandwidth of the bottleneck communications device is totally occupied.

9. The method according to claim 7, wherein the method further comprises:

sending the target maximum allowed bandwidth of the $j^{th}$ service type to the $i^{th}$ communications device.

10. A communications device, comprising:

a receiver configured to receive a packet flow;

at least one processor;

a non-transitory computer-readable storage medium coupled to the at least one processor and storing programming instructions for execution by the at least one processor, the programming instructions instruct the at least one processor to:

determine, based on a service type of the packet flow, a service pipeline used for transmitting the packet flow, wherein service types of all packet flows in the service pipeline are the same;

determine a multiplier based on a congestion status of the service pipeline, wherein:

if the service pipeline is in a non-congested state, the multiplier is (1+W), wherein W is a bandwidth weight allocated to the service type; or if the service pipeline is in a congested state, the multiplier is (1−αW), wherein W is the bandwidth weight allocated to the service type, wherein α is a congestion degree of the service pipeline, and wherein 0<α<1;

determine a product by multiplying the multiplier and a transmission rate of the service pipeline at a first moment;

determine, based on the product, a transmission rate of the service pipeline at a second moment, wherein the first moment is earlier than the second moment; and based on the bandwidth weight allocated to the service type and the transmission rate of the service pipeline at the second moment, transfer the packet flow by using the service pipeline.

11. The communications device according to claim 10, wherein the programming instructions instruct the at least one processor to:
  determine in-pipeline scheduling on the packet flows in the service pipeline based on the service type of the packet flow in the service pipeline, wherein the in-pipeline scheduling on the packet flows in the service pipeline is specified for the service pipeline and is different from another in-pipeline scheduling on other packet flows in another service pipeline, wherein the other packet flows in the another service pipeline are all of another service type that is different from the service type; and
  perform the in-pipeline scheduling on the packet flows in the service pipeline based on the service type of the packet flow in the service pipeline.

12. The communications device according to claim 11, wherein the programming instructions instruct the at least one processor to:
  if the service type of the packet flow in the service pipeline is a throughput sensitive service, perform scheduling on the packet flows in the service pipeline in a first in first out queue scheduling manner;
  if the service type of the packet flow in the service pipeline is a deadline sensitive service, determine a priority of each packet flow based on a deadline of each service flow in the service pipeline, and schedule each packet flow based on the priority of each packet flow, wherein a service flow with an earlier deadline is corresponding to a higher priority;
  if the service type of the packet flow in the service pipeline is a latency sensitive service, perform scheduling on the packet flows in the service pipeline in a first in first out queue scheduling manner; or
  if the service type of the packet flow in the service pipeline is a priority sensitive service, determine a priority of each packet flow in the service pipeline, and schedule each packet flow based on the priority of each packet flow.

13. The communications device according to claim 10, wherein the programming instructions instruct the at least one processor to:
  determine the transmission rate of the service pipeline based on the congestion status of the service pipeline.

14. The communications device according to claim 13, wherein the first moment is t−T, wherein the second moment is t, wherein the programming instructions instruct the at least one processor to:
  if the service pipeline is in the non-congested state, determine a transmission rate R(t) of the packet flow in the service pipeline at the second moment t by using the following formula:

$R(t) = \min(R(t-T) \times (1+w), R_{max} \times w)$, wherein the transmission rate of the service pipeline at the first moment t−T is R(t−T), and maximum bandwidth that can be occupied by the service pipeline is $R_{max}$; or
  if the service pipeline is in the congested state, determine a transmission rate R(t) of the packet flow in the service pipeline at the second moment t by using the following formula:

$R(t) = R(t-T) \times (1-\alpha w)$, wherein the transmission rate of the service pipeline at the first moment t−T is R(t−T).

15. The communications device according to claim 10, wherein the communications device further comprises:
  a transmitter configured to send a weight notification message to a mediation device, and the weight notification message carries current usage bandwidth of each service type on the communications device; and
  the receiver is further configured to receive a weight notification response fed back by the mediation device, wherein the weight notification response carries a target bandwidth weight of each service type.

* * * * *